United States Patent
Bajer et al.

(10) Patent No.: US 11,712,028 B2
(45) Date of Patent: Aug. 1, 2023

(54) ROPE RELEASING APPARATUS, FISHING SYSTEM AND METHOD FOR CONTROLLING A FISHING SYSTEM

(71) Applicant: Carp Solutions, LLC, New Brighton, MN (US)

(72) Inventors: Przemyslaw G. Bajer, New Brighton, MN (US); Michael V. Hirt, Willowbrook, IL (US)

(73) Assignee: Carp Solutions, LLC, New Brighton, MN (US)

( * ) Notice: Subject to any disclaimer, the term of this patent is extended or adjusted under 35 U.S.C. 154(b) by 200 days.

(21) Appl. No.: 17/200,602

(22) Filed: Mar. 12, 2021

(65) Prior Publication Data

US 2022/0287285 A1    Sep. 15, 2022

(51) Int. Cl.
   *A01K 73/05*   (2006.01)
   *A01K 97/12*   (2006.01)
   *A01K 75/00*   (2006.01)
   *A01K 69/04*   (2006.01)

(52) U.S. Cl.
   CPC ............ *A01K 73/05* (2013.01); *A01K 97/125* (2013.01); *A01K 69/04* (2013.01); *A01K 75/00* (2013.01)

(58) Field of Classification Search
   CPC .............................. A01K 73/05; A01K 97/125
   See application file for complete search history.

(56) References Cited

U.S. PATENT DOCUMENTS

| | | | |
|---|---|---|---|
| 4,082,055 A * | 4/1978 | Brown .................... | A01K 73/02 114/244 |
| 4,347,680 A * | 9/1982 | Kaestner ................ | A01K 73/06 43/4.5 |
| 6,481,378 B1 * | 11/2002 | Zemach .................. | A01K 61/60 119/223 |
| 2016/0205905 A1 * | 7/2016 | Souther .................. | A01K 75/00 |
| 2020/0068860 A1 | 3/2020 | Bajer | |

FOREIGN PATENT DOCUMENTS

GB             190921848 A  *  9/1909

\* cited by examiner

*Primary Examiner* — Jessica B Wong
(74) *Attorney, Agent, or Firm* — PV IP PC; Ude Lu; Wei Te Chung (57) ABSTRACT

A rope releasing apparatus includes an actuator, a wireless receiver for receiving a wireless signal to control the actuator, and a rope securing mechanism mechanically coupled to the actuator. The rope securing mechanism secures a rope. The rope is attached to a fishing net. In response to receiving the wireless signal, the wireless receiver activates the actuator to cause the rope securing mechanism to release the rope.

14 Claims, 9 Drawing Sheets

ROPE RELEASING APPARATUS, FISHING SYSTEM AND METHOD FOR CONTROLLING A FISHING SYSTEM

FIELD OF INVENTION

The present disclosure relates to fishing devices and methods for control the fishing devices, and more particularly, to rope releasing apparatuses, fishing systems, and methods for controlling a fishing system.

BACKGROUND OF INVENTION

Invasive fish species (such as *Cyprinus carpio*) are serious threat to the native ecosystem. Invasive fish species commonly lack predators and overpopulate. Invasive fish species compete with native fishes for food sources and habitat, causing the populations of native fishes to decline, which may cause further decline of other native species that feed on the native fishes endangering the entire native ecosystem. Invasive fish species need to be removed from the lakes to preserve the natural habitat.

Traditionally, large commercial seine nets are used for removing invasive fish species. However, the seine nets often capture both invasive fish species and native fishes. Capturing invasive fish species by the seine nets is not very selective.

Recently, a fishing system has been developed that can selectively attract invasive fish species to a capturing area and effectively capture invasive fish species. However, the fishing system is triggered by triggering ropes, such that the location where the fishing system be set, and the capturing area of the fishing system are limited by the triggering ropes. For example, the fishing system needs to be located near the shore, or the range of the capturing area depends upon the length of the triggering ropes. In addition, the triggering ropes submersed in the water may mis-trigger the fishing system by the water wave action or the water current. See U.S. patent application Ser. No. 16/250,231, which is incorporated herein by reference in its entirety.

SUMMARY OF INVENTION

The present disclosure relates to fishing devices and methods for controlling the fishing devices. The embodiments disclosed herein can be remotely/wirelessly triggered, therefore the fishing device can be setup at any desired location in the body of water, not limited by the length of the triggering rope. The embodiments disclosed herein prevents mis-triggering caused by the water wave action or the current. Further, the ability to trigger the fishing devices remotely will allow for triggering at times when aggregations of invasive fish in the fishing device are densest. This is possible because the presence of invasive fish in the fishing device can be monitored remotely through the use of electronic antennas and data loggers that send data online. Also, because the triggers can be activated via the use of a cell phone, an integrated system is possible where the antennas and data loggers send data on line, which is then evaluated by a decision maker, e.g., a human, a machine, a software, an algorithm, etc, to trigger the actuators remotely. In one embodiment, a computer software can also be set up to automatically analyze the data from antennas and trigger the actuators remotely via a cellphone once the number of fish inside the removal device exceeds a certain threshold.

According to one embodiment of the present disclosure, a rope releasing apparatus includes an actuator, a wireless receiver for receiving a wireless signal to control the actuator, and a rope securing mechanism mechanically coupled to the actuator. The rope securing mechanism secures a rope. The rope is attached to a fishing net. In response to receiving the wireless signal, the wireless receiver activates the actuator to cause the rope securing mechanism to release the rope.

According to one embodiment of the present disclosure, a rope releasing apparatus includes an actuator, a wireless receiver for receiving a wireless signal to control the actuator, and a rope securing mechanism mechanically coupled to the actuator. The rope securing mechanism secures a rope. The rope is attached to a fishing net. In response to receiving the wireless signal, the wireless receiver activates the actuator to cause the rope securing mechanism to release the rope. It is noted such rope releasing apparatus can be used for any general purpose that requires securing and releasing a rope, and should not be interpreted merely for triggering a fishing system.

In one embodiment of the present disclosure, the rope is connected to a weight. In one embodiment of the present disclosure, the actuator includes a motor. In one embodiment of the present disclosure, the rope securing mechanism includes a screw.

In one embodiment of the present disclosure, the rope releasing apparatus further includes a case for accommodating the actuator and the wireless receiver, and a power source to provide electric power to the actuator and/or the wireless receiver. The rope securing mechanism is mechanically coupled to the actuator through the case.

In one embodiment of the present disclosure, the wireless receiver receives the wireless signal transmitted from a transmitter, a remote controller, a mobile device, a computer, or a control center.

According to one embodiment of the present disclosure, a fishing system for fishing in a body of water includes a post disposed in the body of water, wherein a first portion of the post is above a water surface of the body of water, a fishing net disposed in the body of water, a rope slidably attached to the post, wherein a first portion of the rope is connected to a weight, and a second portion of the rope is connected to the fishing net, and a rope releasing apparatus disposed on the first portion of the post. The rope releasing apparatus includes an actuator, a wireless receiver for receiving a wireless signal to control the actuator, and a rope securing mechanism coupled to the actuator. A portion of the rope is secured directly or indirectly by the rope securing mechanism for holding the weight. In response to receiving the wireless signal, the wireless receiver controls the actuator to cause the rope securing mechanism to release the rope.

In one embodiment of the present disclosure, the actuator includes a motor. In one embodiment of the present disclosure, the rope securing mechanism includes a tapered or non-tapered screw.

In one embodiment of the present disclosure, the tapered or non-tapered screw includes a base adjacent to the actuator and a tip away from the actuator. The base has a larger diameter than the tip, wherein a rotation of the tapered or non-tapered screw moves the portion of the rope secured by the rope securing mechanism from the base to the tip where the rope slips off the tip of the tapered or non-tapered screw thereby releasing the rope.

In one embodiment of the present disclosure, the fishing system for fishing in the body of water further includes a sensor disposed under the water surface. In one embodiment of the present disclosure, the sensor includes a camera, an acoustic sensor, a passive integrated transponder sensor or antenna, a heat sensor, or a light sensor. In one embodiment of the present disclosure, the fishing system for fishing in the body of water further includes a baiting device disposed within the fishing net.

According one embodiment of the present disclosure, a method for controlling a fishing system includes: receiving a wireless signal by a wireless receiver, activating an actuator, and causing a rope securing mechanism coupled to the actuator to release a rope, wherein a first portion of the rope is connected to a weight, a second portion of the rope is connected to a fishing net, and the weight is kept by the rope securing mechanism at a first position.

In one embodiment of the present disclosure, the actuator includes a motor. In one embodiment of the present disclosure, causing the rope securing mechanism coupled to the actuator to release the rope further includes: rotating a screw of the rope securing mechanism. In one embodiment of the present disclosure, the method for controlling the fishing system further includes: transmitting the wireless signal from a transmitter, a remote controller, a mobile device, a computer, or a control center.

In one embodiment, the actuator may include an electric winch. In this embodiment, there is no need for a weight. The electric winch itself may be able to pull the fishing net above the water upon a wireless signal, switching from the baiting mode to the harvest mode. The electric winch may hold, pull in (wind up), and/or let out (wind out) the rope connected to the fishing net. The electric winch may pull in the rope by rotating its spool (or drum) in one direction (e.g., clockwise or counterclockwise) and let out the rope by rotating its spool to the other direction. The electric winch may also hold steady of the rope.

In one embodiment of the present disclosure, the method for controlling the fishing system further includes: collecting data using a sensor disposed under a water surface. In one embodiment of the present disclosure, the sensor includes a camera, an acoustic sensor, a passive integrated transponder sensor or antenna, a heat sensor, or a light sensor. In one embodiment of the present disclosure, the method for controlling the fishing system further includes: setting up a baiting device before causing the rope securing mechanism coupled to the actuator to release the rope.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DESCRIPTION OF DRAWINGS

For a more complete understanding of the disclosed systems and methods, reference is now made to the following descriptions taken in conjunction with the accompanying drawings.

DETAILED DESCRIPTION OF PREFERRED EMBODIMENTS

In the following detailed description of the preferred embodiments, reference is made to the accompanying drawings which form a part hereof, and in which is shown by way of illustrating specific embodiments in which the disclosure may be practiced. In this regard, directional terminology, such as "top", "bottom", "front", "back", "left", "right", "inside", "outside", "side", etc., is used with reference to the orientation of the figure(s) being described. As such, the directional terminology is used for purposes of illustration and is in no way limiting.

Figure 1:
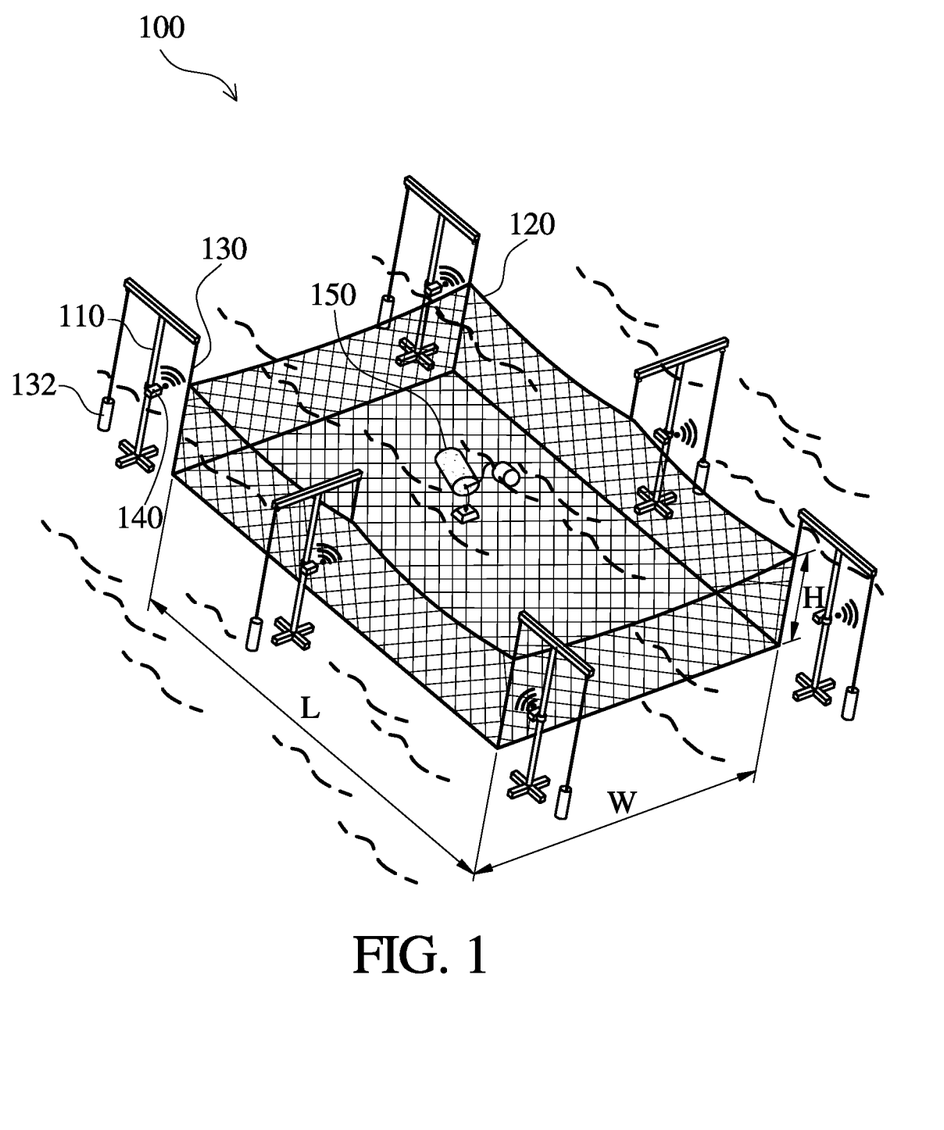
FIG. 1 shows a fishing system for fishing in a body of water according to one embodiment of the present disclosure.
Figure 2:
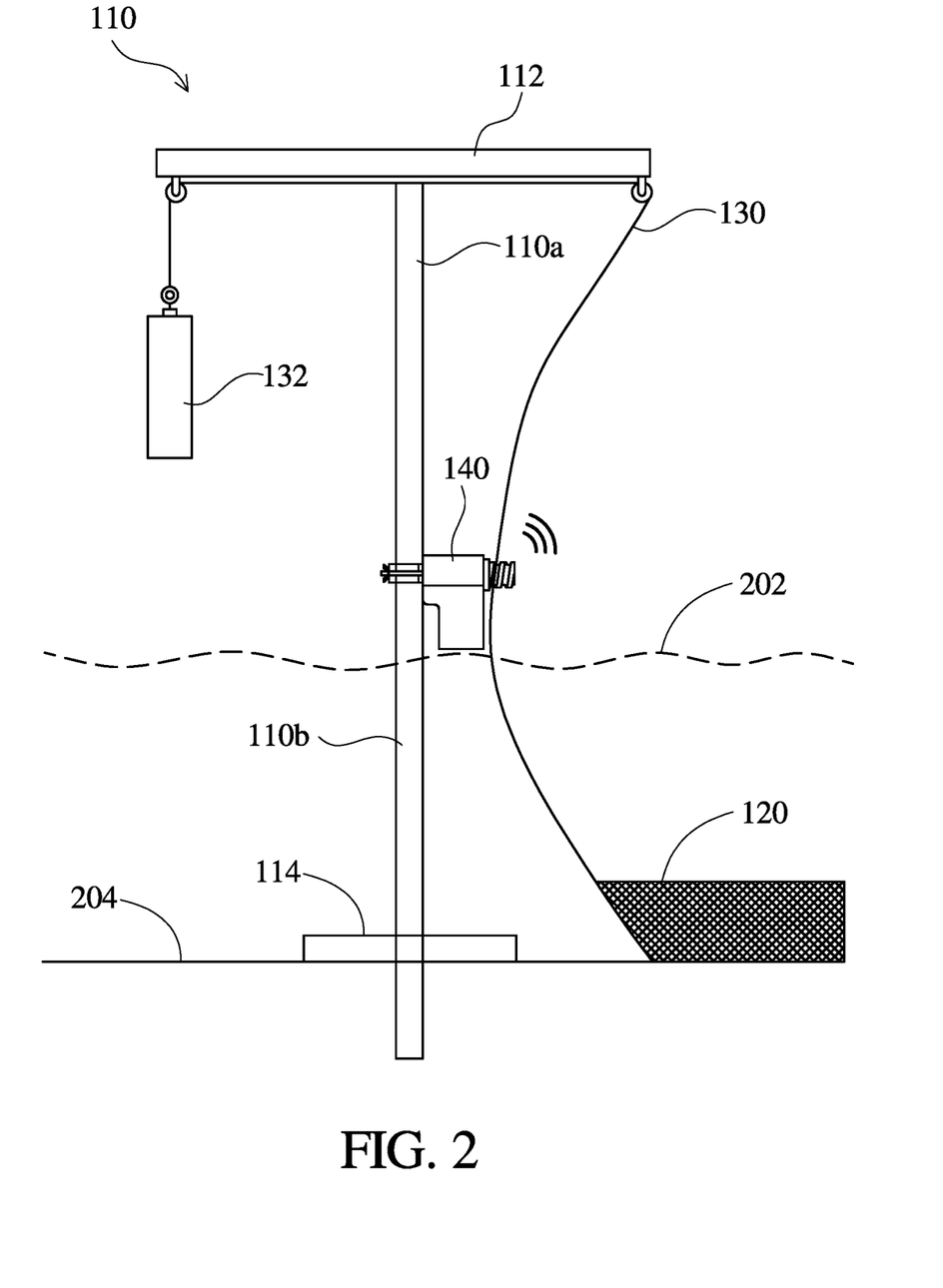
FIG. 2 shows the fishing system in a baiting mode, wherein sides of the net near the bottom of the water body, according to one embodiment of the present disclosure.
Figure 3:
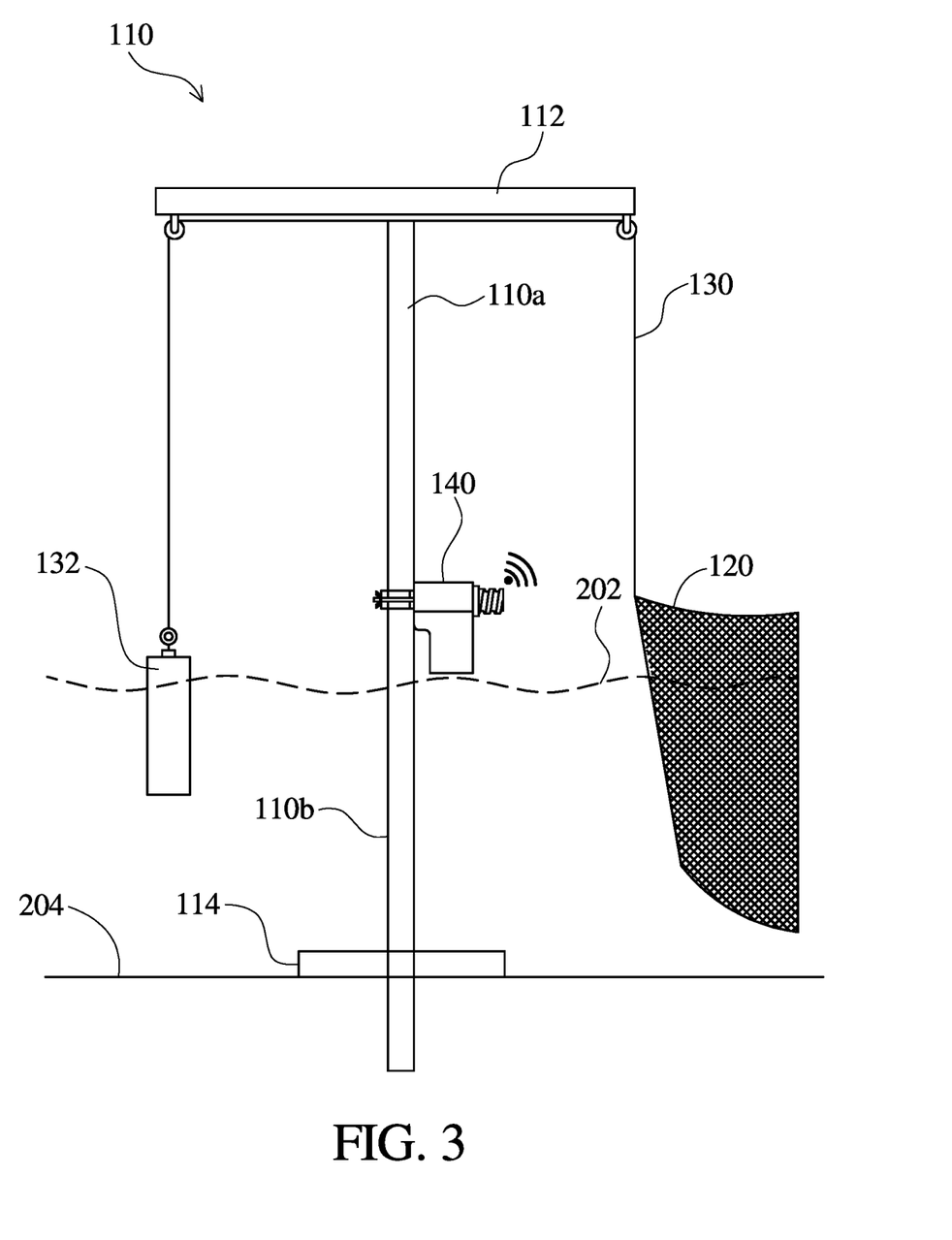
FIG. 3 shows the fishing system in a harvest mode, wherein sides of the net raised above the surface of the water according to one embodiment of the present disclosure.

Please refer to FIG. 1 to FIG. 3, FIG. 1 shows a fishing system 100 for fishing in a body of water according to one embodiment of the present disclosure, FIG. 2 shows the fishing system 100 in a baiting mode according to one embodiment of the present disclosure, and FIG. 3 shows the fishing system 100 in a harvest mode according to one embodiment of the present disclosure. The fishing system 100 includes a plurality of posts 110, a fishing net 120, a plurality of ropes 130, a plurality of rope releasing apparatus 140, and a baiting device 150.

As shown in FIG. 2, the posts 110 are disposed in the body of water. A first portion 110a of the post 110 is above a water surface 202 of the body of water, and a second portion 110b of the post 110 in under the water surface 202 of the body of water. The post 110 may include a cross bar 112 and a bottom cross 114. The post 110 is inserted to a bottom 204 of the body of water (such as a lake), and the bottom cross 114 is disposed on the bottom 204 of the body of water to support the second portion 110b of the post 110.

As shown in FIG. 1, the fishing net 120 is disposed in the body of water. The fishing net 120 is in a shape of a box with a horizontal bottom and four vertical sides, and the fishing net 120 has no top. The fishing net 120 has a width (W), a length (L), and a height (H). In one embodiment, L is from 10 to 300 feet, preferably 50-120 feet. In one embodiment, the W is from 5 to 200 feet, preferably 20-60 feet. In one embodiment, the H is from 1 to 50 feet, preferably 8-15 feet.

The ropes 130 are slidably attached to the corresponding post 110. As shown in FIG. 2, the rope 130 is slidably attached to the cross bar 112 of the post 110 by pulleys. A first portion to the rope 130 is connected to a weight 132, and a second portion of the rope 130 is connected to the fishing net 120. The second portion of the rope 130 can be connected to a corner of the fishing net 120, and the second portion of the rope 130 also can be connected to a middle point along the length of the fishing net 120.

The rope releasing apparatus 140 is disposed on the first portion 110a of the post 110. As shown in FIG. 2, when the fishing system 100 in the baiting mode, the rope 130 is attached to the rope releasing apparatus 140, and the weight 132 is kept at a first position (a relatively higher position) by the rope releasing apparatus 140. As shown in FIG. 3, when the fishing system 100 in the harvest mode, the rope releasing apparatus 140 receives a wireless signal to release the rope 130, and then the weight 132 is dropping form the first position to a second position (a relatively lower position). In specific, the first position is higher than the second position. In this way, the fishing net 120 is pulled up at or above the water surface 202, thereby encircling the fishes intended to be removed within the fishing net 120.

In one embodiment, the rope releasing apparatus 140 may include an electric winch. In this embodiment, a weight 132 may not be needed. The electric winch itself may be able to pull the fishing net 120 above the water upon receiving a wireless signal, switching the fishing system 100 from the baiting mode to the harvest mode. The electric winch may hold, pull in (wind up), and/or let out (wind out) the rope 130 connected to the fishing net 120. The electric winch may pull in the rope 130 by rotating its spool (or drum) in one direction (e.g., clockwise or counterclockwise) and let out the rope 130 by rotating its spool to the other direction. The electric winch may also hold steady of the rope 130.

Figure 4:
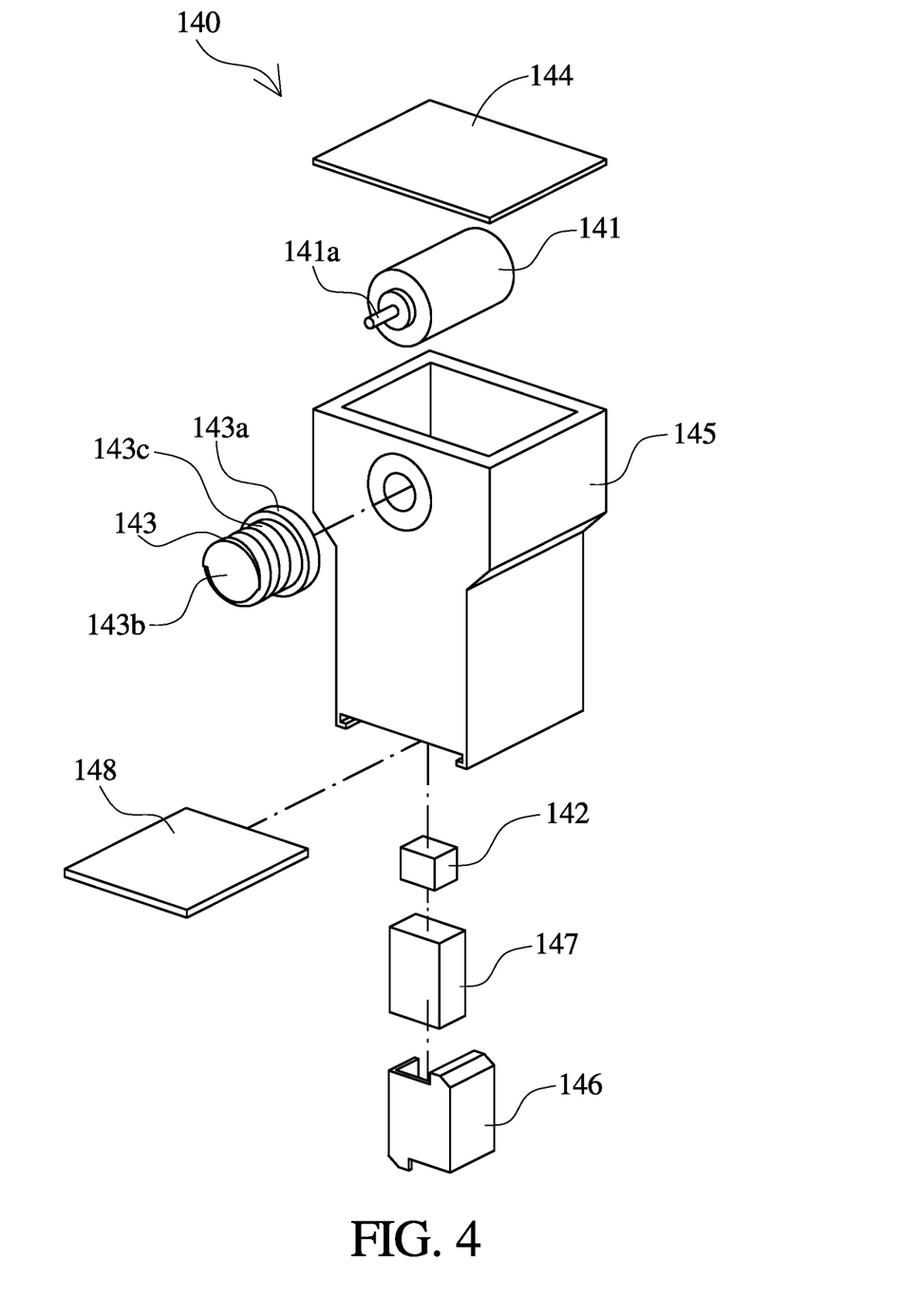
FIG. 4 is an exploded view of a rope releasing apparatus according to one embodiment of the present disclosure.
Figure 5:
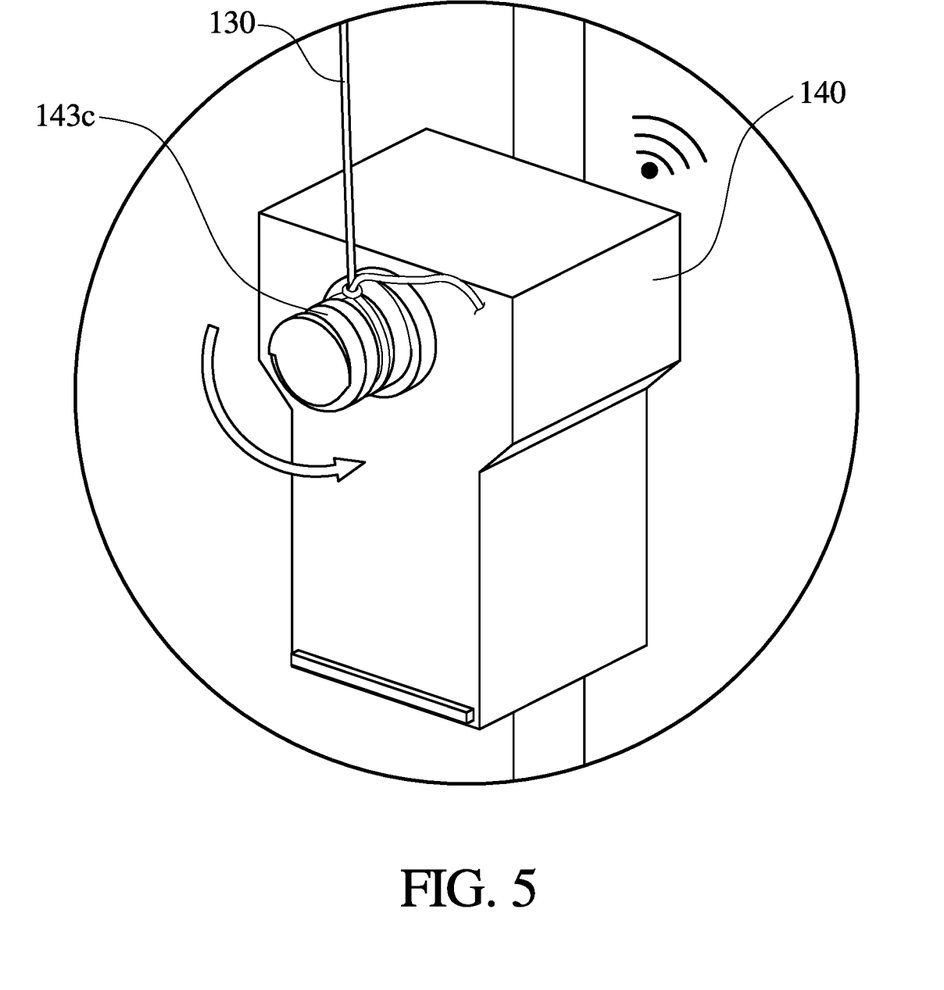
FIG. 5 shows the motion of the rope releasing apparatus according to one embodiment of the present disclosure. As the tapered screw turns, the loop on the rope slides off of the tapered screw.

Please refer to FIG. 4 and FIG. 5, FIG. 4 is an exploded view of a rope releasing apparatus 140 according to one embodiment of the present disclosure, and FIG. 5 shows the motion of the rope releasing apparatus according to one embodiment of the present disclosure. The rope releasing apparatus 140 includes an actuator 141, a wireless receiver 142, a rope securing mechanism 143, a lid 144, a case 145, a receiver holding box 146, a power source 147, and a sliding bottom plate 148.

The case 145 is used for accommodating the actuator 141, the wireless receiver 142 and the power source 147. The lid 144 is disposed on the top of the case 145, and the sliding bottom plate 148 is disposed at the bottom of the case 145. The lid 144, the case 145, and the sliding bottom plate 148 can prevent the components in the case 145 (such as the wireless receiver 142 and the power source 147) from damaging caused by the outside environment.

The receiver holding box 146 is disposed in the case 145 for supporting the wireless receiver 142 and the power source 147. The power source 147 is used to provide electric power to the actuator 141 and/or the wireless receiver 142. The power source 147 may be a battery. In one embodiment, the power source 147 may be a lithium ion battery or a nickel-metal hydride battery. In one embodiment, the power source 147 is a 12-volt DC 2000 mAh nickel-metal hydride battery.

In one embodiment, the power source 147 can be charged with renewable energy, e.g., solar power, wind power, motion power, etc. In one embodiment, the power source 147 is charged with solar panels, wind mills, and/or any device that harvest power from the motion of the body of water.

In another embodiment, the power source 147 may also power sensors that collects data, and the collected data may include time, lightness, temperature, sonic signal, radio signals, electric inductance signals, images, wireless tracing signals, infra-red, UV ray, etc.

In one embodiment, a portion of the fishes within the body of water carry wireless tracing devices. Corresponding receiver for the wireless tracing signal is housed in the case 145. In another embodiment, the power source 147 may also power a data processor that is able to process the collected data (time, lightness, temperature, sonic signal, wireless signal, infra-red signal, UV-ray, etc). The processor may have access to a machine-readable medium for recording the collected data.

The case 145 may also include 3G/4G/5G cellular communication equipment for sending/receiving cellular communications. In one embodiment, the processor may send data or receive communication through the 3G/4G/5G cellular communication equipment.

The actuator 141 is disposed in the case 145. In one embodiment, the actuator 141 is supported by a curved clamp and attached to the case 145. In one embodiment, the actuator 141 includes a motor, such as a 12-volt electric geared motor. In one embodiment, the actuator 141 is a motor with a motor shaft 141a.

The wireless receiver 142 is configured for receiving a wireless signal to control the actuator 141. The wireless receiver 142 may receive the wireless signal transmitted from a transmitter, a remote controller, a mobile device, a computer, or a control center. In addition, the wireless signal may have a predetermined frequency, such as a 433 MHz radio signal.

The rope securing mechanism 143 is mechanically coupled to the actuator 141. The rope securing mechanism 143 can directly secure a portion of the rope 130 attached to the fishing net 120, thereby holding the weight 130. In another embodiment, the rope securing mechanism 143 can indirectly secure a portion of the rope 130 attached to the fishing net 120, thereby holding the weight 130. In one embodiment, the rope securing mechanism 143 includes a tapered screw, and the tapered screw includes a base 143a adjacent to the actuator 141, a tip 143b away from the actuator 141, and a groove 143c spirally disposed between the base 143a and the tip 143b. The base 143a has a larger diameter than the tip 143b. In one embodiment, the base 143a includes a hole, and the motor shaft 141a of the actuator 141 may insert into the hole, therefore the rope securing mechanism 143 is mechanically coupled to the actuator 141. The groove 143c is used for securing a portion of the rope 130, such as a slip knot, a loop attached to the rope, or similar knot shown in FIG. 5.

In another embodiment, the rope securing mechanism 143 may include non-tapered screw, wherein the tip 143b has an equal or larger diameter than the base 143a.

In response to receiving the wireless signal, the wireless receiver 142 activates the actuator 141 to cause the rope securing mechanism 143 to release the rope 130. In one embodiment as shown in FIG. 5, the wireless receiver 142 activates the actuator 141 to rotate the rope securing mechanism 143. The rotation of the rope securing mechanism 143 (such as the tapered screw) moves the portion of the rope 130 (such as the slip knot) secured by the rope securing mechanism 143 from the base 143a to and past the tip 143b, thereby releasing the rope 130.

Figure 6A:
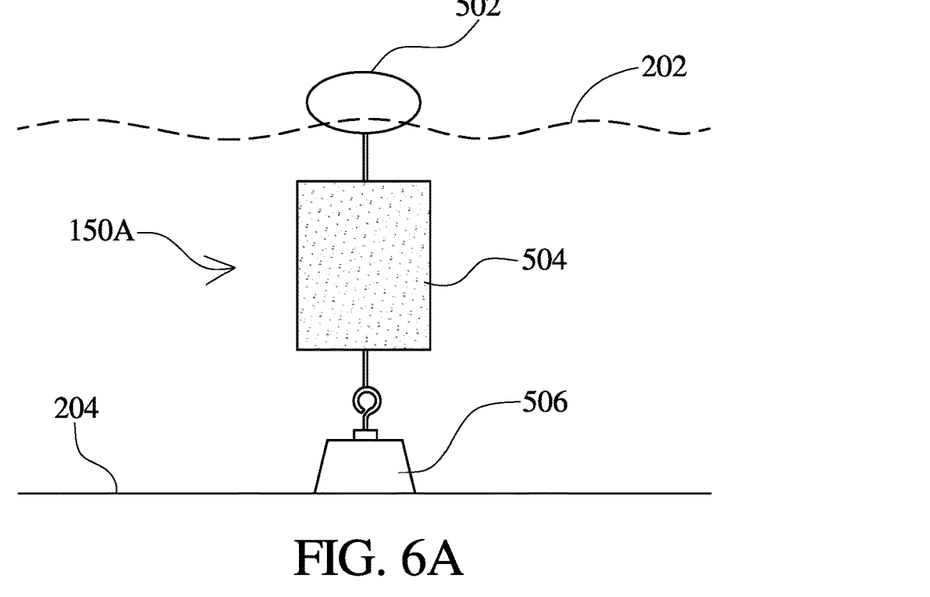
FIG. 6A shows a baiting device according to one embodiment of the present disclosure.

FIG. 6A shows a baiting device 150A according to one embodiment of the present disclosure. e. The baiting device 150A is disposed within the fishing net 120. The baiting device 150A includes a float 502, a bait bag 504, and an anchor 506. The float 502 floats on top of the water surface 202. The float 502 indicates where the baiting device 150A is located.

The bait bag 504 is a container that contains the bait and allows the fish to feed from it. In one embodiment, the bait bag 504 is a made with mesh. The mesh of the bait bag 504 has openings 5% to 50% smaller in diameter than the bait particle. The mesh material is somewhat elastic such that the fish can suck the bait out of the bait bag through the opening of the mesh. When fishes are not feeding on the bait, the bait stays inside of the bait bag 504 because the mesh opening of the bait bag 504 is smaller than the bait particle. In one embodiment, the bait is crushed corn kernels with a particle diameter of 0.1-0.5 cm. In another embodiment, the bait is whole corn kernel with a particle diameter of 0.5-1.5 cm. In one embodiment, the bait bag 504 may contain 30 to 100 pounds of bait.

In one embodiment, the bait bag 504 can include two or more mesh bags overlapping with each other to slow down the consumption rate of the fish. Slowing down the bait consumption speed can retain the fishes longer within the fishing net 120.

The anchor 506 is attached to the bait bag and holds the bait bag 504 in place, such that the bait bag 504 stays inside the net. The anchor 506 weighs from 2 to 20 pounds.

Figure 6B:
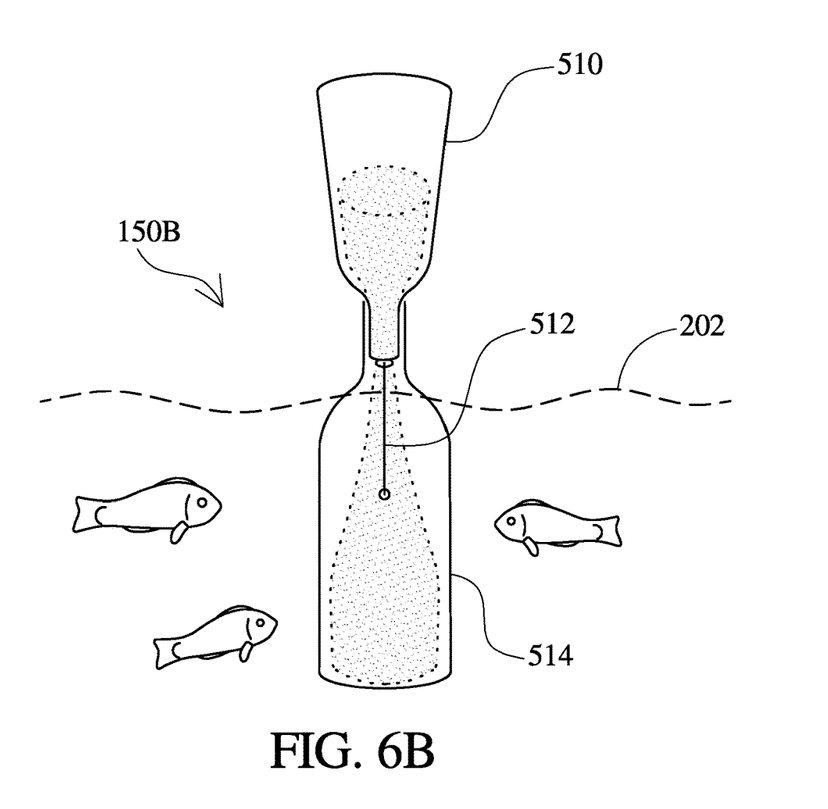
FIG. 6B shows a baiting device according to one embodiment of the present disclosure.

FIG. 6B shows a baiting device 150B according to one embodiment of the present disclosure. The baiting device 150B is disposed within the fishing net 120. The baiting device 150B has automatic on-demand feeder and/or bait-refill functionality. The baiting device 150B includes a tank 510, a trigger rod 512, and a bait bag 514.

The bait bag 514 is the same or similar to the bait bag 504. The tank 510 is positioned higher than the bait bag 514. The baiting device 150B may include a float assistance mechanism to maintain the tank 510 floating on top of the water surface 202 and maintain its up-right position as shown in FIG. 6B. The tank 510 includes a trigger rod 512. When the fishes are feeding out of the bait bag 514, the trigger rod 512 is inevitably touched by the fishes. When the trigger rod 512 is being moved around by the fishes, the bait contained in the tank 510 is released into the bait bag 514. Thus, the tank 510 automatically fills the bait bag 514 as the bait are being consumed. The tank 510 has the capacity to store an amount of bait at least equal or larger than the bait bag 514.

In one embodiment, the tank 510 has the capacity to store a first amount of bait. The bait bag 514 has the capacity to store a second amount of bait. The first amount is at least the same or larger than the second amount. In one embodiment, the first amount is 50-200 pounds, and the second amount is 50 pounds.

In one embodiment, the baiting device 150B includes the tank 510 with the trigger rod 512, but not the bait bag 514. In this embodiment, the bait will be released directly into the water when the fishes touch the trigger rod 512. As such, the fishes can consume the bait directly without sucking the bait out of the bait bag 514.

Figure 7:
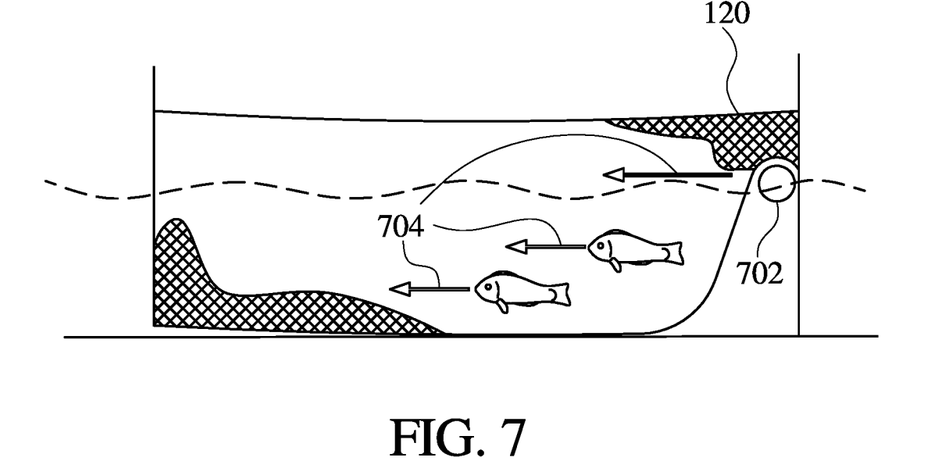
FIG. 7 shows a floating pipe that assists the harvesting according to one embodiment of the present disclosure.

FIG. 7 shows a floating pipe 702 that assists the harvesting according to one embodiment of the present disclosure. When harvesting the fishes, one or more floating pipes 702 can be used to assist the process of harvest. The floating pipe 702 is inserted underneath the fishing net 120. A user of the fishing system 100 can push the floating pipe 702 in a direction 704. By pushing the floating pipe 702 in the direction 704, the fishes in the fishing net 120 are also being pushed to the direction 704. In this way, the fishes in the fishing net 120 are concentrated in a desired area, e.g., where the boat is, facilitating the process of harvesting the fishes.

In one embodiment, the floating pipe 702 is a PVC pipe capped at each end to achieve maximum buoyancy. In one embodiment, several capped PVC pipes are connected end-to-end using flexible joints which allow for flexibility of the floating pipe 702, which helps with aggregating fish in a desired area such as shown on FIG. 7.

After the weights 132 are dropped and the perimeter of the fishing net 120 is raised above the water surface 202, the fishes are encircled within the fishing net 104, i.e., the harvest mode. One or more floating pipes 702 are inserted under the bottom of the fishing net 120. The floating pipes 702 raise the portion of the bottom of the fishing net 120 in contact with the pipes 702 above the water surface. In one embodiment, the portion of the bottom of the fishing net 120 in contact with the floating pipe 702 can be raised three feet or less above the water surface 202.

One or more users can then push the floating pipes 702 toward one corner or one side of the fishing net 120 to concentrate the fishes, which allows harvesting the fishes en masse conveniently. In one embodiment, harvesting may occur by pulling or rolling the part of the net where the fish are aggregated onto a boat.

Figure 8:
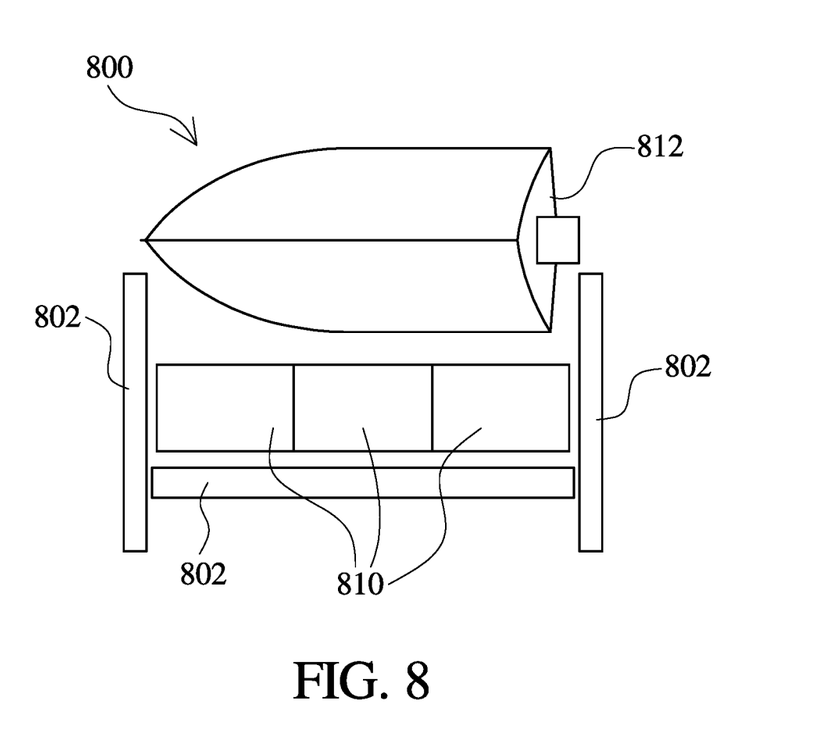
FIG. 8 shows an assembly of harvesting tools according to one embodiment of the disclosure.

FIG. 8 shows an assembly 800 of harvesting tools according to one embodiment of the disclosure. The assembly 800 includes a plurality of floating pipes 802 and a plurality of harvest cages 810, and at least one motorized boat 812.

As shown in FIG. 8, there are three floating pipes 802. In one embodiment, each of three users pushes one of the three floating pipes 802 toward a first side of the boat 812. A plurality of harvest cages 810 are pre-disposed at the first side of the boat 812. The cages 810 may include an open top, such that when the fishes are concentrated they easily fall into the cages 810. The motorized boat 812 may include one or more cranes to lift up the harvest cages 810 into the boat.

The fishing system 100 further includes a plurality of sensors (not shown). The sensors are disposed above or under the water surface 202. The sensors may include a camera, an acoustic sensor, an electric inductance sensor or antenna, a heat sensor, a wireless signal tracing receiver, a light sensor, and/or cellular communication (e.g., 3G/4G/5G) receiver. The sensors collect data, and the data includes time, lightness, temperature, sonic signal, signal from passive integrated transponders, images, wireless tracing signals, cellular communication, etc. The data can be transmitted to and from a mobile device, computer, remote controller, or a control center. The data is analyzed against one or more predetermined thresholds. In one embodiment, the data is used to analyze the predetermining amount of the fishes in the fishing net 120. The user may active/trigger the fishing system 100 to switch from the baiting mode to a harvest mode according to the data. In addition, the fishing system 100 may activated/triggered automatically, when the data satisfies one or more predetermined thresholds.

In one scenario, the baiting device 150 in the fishing net 120 attracts the fishes intended to be removed. The sensors collect the data about the fishes, and the users activate/trigger the fishing system 100 according to the data. When the user transmits a wireless signal to the rope releasing apparatus 140 by the remote controller, the fishing system 100 is switched from the baiting mode to the harvest mode. The fishes intended to be removed (such as invasive fish species) can be captured effectively with high selectivity. The fishing system 100 can be triggered remotely/wirelessly.

The fishing system 100 also can prevent from mis-triggering caused by the wave or the current. In addition, the location to be set and the capturing area of the fishing system 100 may not be limited by trigging ropes.

In one embodiment, a portion of the entire population of the fishes in the body of water carry wireless tracking devices, e.g., global position system (GPS), radio-frequency identification (RFID), passive integrated transponder (PIT), and/or other telemetry communication devices. The fishing system 100 includes detectors that is able to receive signals from the tracking devices carried by the fishes. The fishing system 100 can then monitor real-time of how many fishes carrying the tracking devices are within the fishing net 120. Knowing the total amount of fishes carrying the tracking device and the number of fishes within the net, an estimated percentage of population of fishes within the net can be calculated. For example, if there are a hundred (100) carps carry the wireless tracking devices and the fishing system 100 detected there are ten (10) of such carps being within the fishing net 120, it can be estimated that ten percent (10%) of the carp population within the body of water is within the net. A decision maker (e.g., a human, an algorithm, a processor executing an algorithm, and/or a machine) can provide the instruction to switch the fishing system 100 from a baiting mode to a harvest mode.

In one embodiment, a decision maker (e.g., a human, an algorithm, a processor executing an algorithm, and/or a machine) may have a predetermined threshold of ten percent (10%) population of carps. Once the threshold is reached, the decision maker instructs the fishing system 100 to switch from a baiting mode to a harvest mode.

Figure 9:
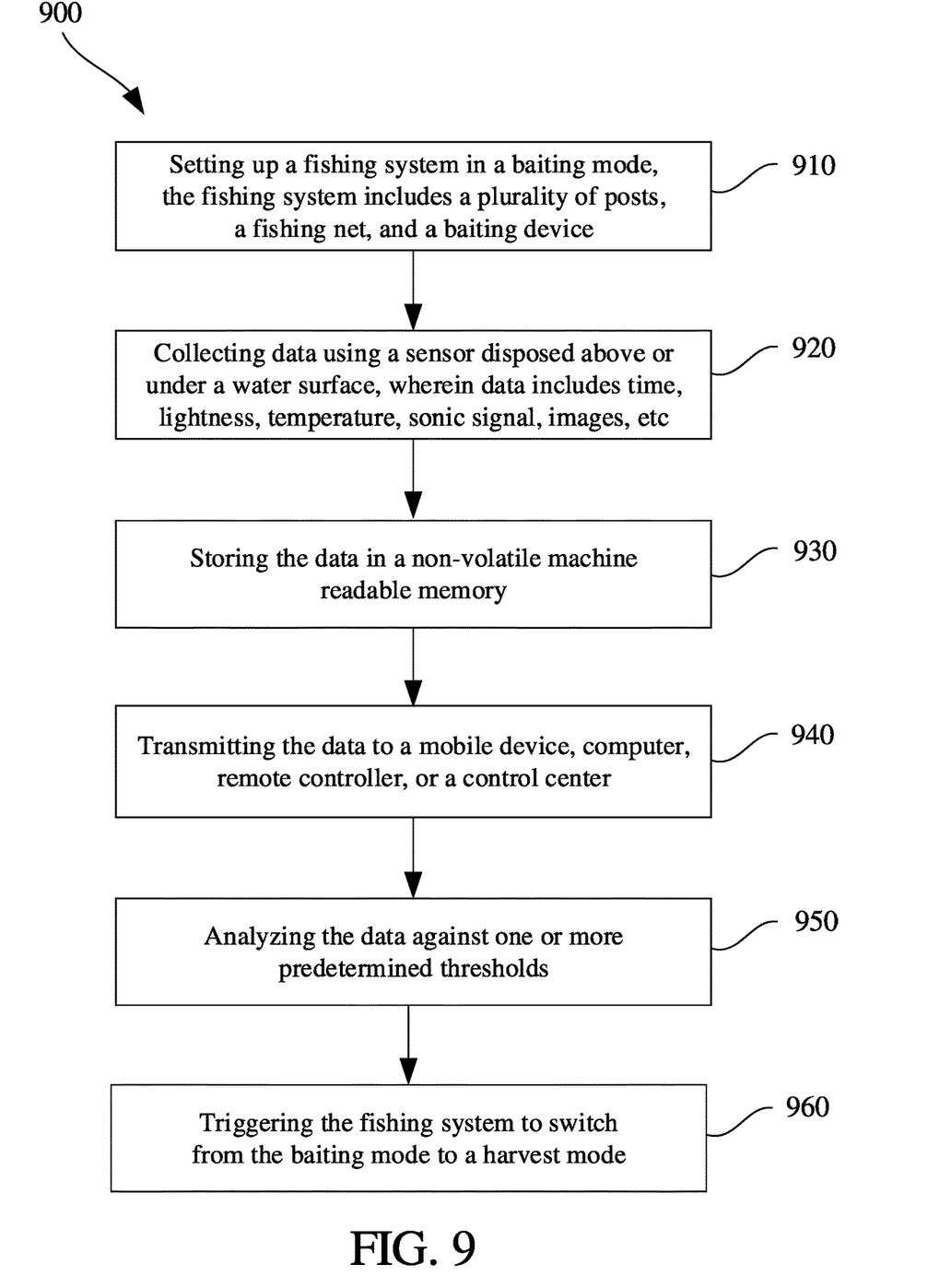
FIG. 9 is a method of controlling a fishing system according to one embodiment of the present disclosure.

FIG. 9. is a method 900 of applying a fishing system 100 according one embodiment of the present disclosure. The method includes 910: setting up a fishing system in a baiting mode, the fishing system includes a plurality of posts, a fishing net, and a baiting device; 920: collecting data using a sensor disposed above or under a water surface, wherein data includes time, lightness, temperature, sonic signal, images, signals from passive integrated transponders, etc; 930: storing the data in a non-volatile machine readable memory; 940: transmitting the data to a mobile device, computer, remote controller, or a control center; 950: analyzing the data against one or more predetermined thresholds; and 960: triggering the fishing system to switch from the baiting mode to a harvest mode. It is noted that the above mentioned process has no particular order.

In 910, setting up the fishing system 100 in the baiting mode includes setting up the posts in the body of water; inserting and securing the posts at the bottom of the body of water; laying out the fishing net 120 at a desired location within the body of water; hanging the weight 132 over the post 110 and securing the weight 132 in a first position (a higher position, baiting position) readily to be switched to a second position (a lower position comparing to the first position, harvest position); setting up the baiting device 150.

In 920, collecting data using a sensor disposed above or under a water surface, wherein data includes time, lightness, temperature, sonic signal, images, etc. The data may further include wireless tracking signals, e.g., global position system (GPS), radio-frequency identification (RFID), passive integrated transponder (PIT), and/or other telemetry communication signals.

In 930, an instruction executing processor may be used to store the data in a non-volatile machine readable memory. The machine readable memory can be, for example, a hard drive, a solid state storage device, an optical storage device, etc. The processor may also process the data according to instructions of an algorithm.

In 940, the data can be transmitted to a mobile device, computer, remote controller, or a control center through any wired/wireless communication protocols (3G/4G/5G, WIFI, Bluetooth, etc).

In 950, analyzing the data against one or more predetermined thresholds. In 950, the data includes time, lightness, temperature, sonic signal, images, etc. In 950, the data may further include wireless tracking signals, e.g., global position system (GPS), radio-frequency identification (RFID), passive integrated transponder (PIT), and/or other telemetry communication signals.

In one embodiment, a portion of the entire population of the fishes in the body of water carry wireless tracking devices, e.g., global position system (GPS), radio-frequency identification (RFID), passive integrated transponder (PIT), and/or other telemetry communication devices. The fishing system 100 includes detectors that is able to receive signals from the tracking devices carried by the fishes. The fishing system 100 can then monitor real-time of how many fishes carrying the tracking devices are within the fishing net 120. Knowing the total amount of fishes carrying the tracking device and the number of fishes within the net, an estimated percentage of population of fishes within the net can be calculated. For example, if there are a hundred (100) carps carry the wireless tracking devices (e.g., PITs, RFIDs, GPS trackers) and the fishing system 100 detected there are ten (10) of such carps being within the fishing net 120, it can be estimated that ten percent (10%) of the carp population within the body of water is within the net. If a predetermined threshold is ten percent (10%) of the population and/or ten (10) of such carps, a decision maker (e.g., a human, an algorithm, a processor executing an algorithm, and/or a machine) can provide the instruction to switch the fishing system 100 from a baiting mode to a harvest mode.

In 960, triggering the fishing system to switch from the baiting mode to a harvest mode. The process of 960 may include all the processes of FIG. 10.

In 960, in one embodiment, the rope releasing apparatus may include a remotely controllable electric winch. In this embodiment, a weight may not be needed. The electric winch itself may be able to pull the fishing net above the water upon receiving a wireless signal, triggering the fishing system to switch from the baiting mode to the harvest mode. The electric winch may hold, pull in (wind up), and/or let out (wind out) the rope connected to the fishing net. The electric winch may pull in the rope by rotating its spool (or drum) in one direction (e.g., clockwise or counterclockwise) and let out the rope by rotating its spool to the other direction. The electric winch may also hold steady of the rope.

Figure 10:
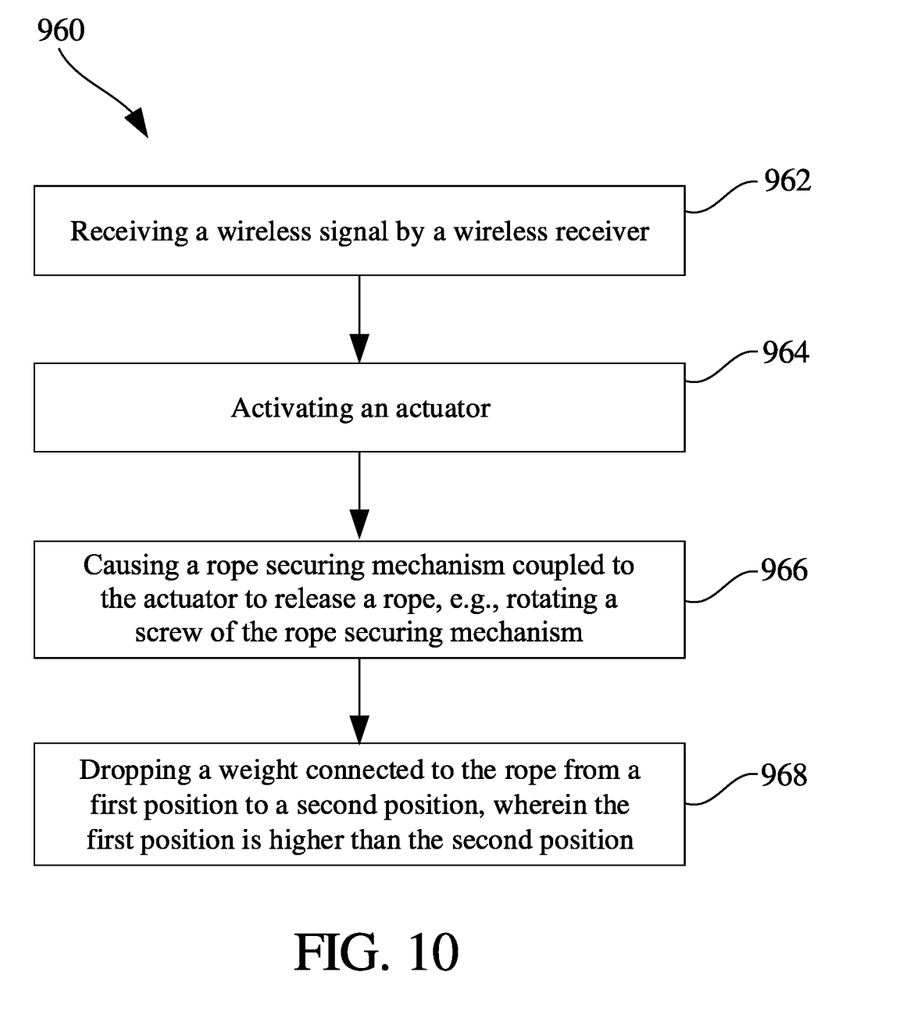
FIG. 10 is a method for triggering a fishing system according to one embodiment of the present disclosure.

FIG. 10 is a flow chart of a method (such as the process 960) for controlling a fishing system according one embodiment of the present disclosure. The process 960 includes a further process 962: receiving a wireless signal by a wireless receiver; a process 964: activating an actuator; and a process 966: causing a rope securing mechanism coupled to the actuator to release a rope, e.g., rotating a screw of the rope securing mechanism. A first portion of the rope is connected to a weight, a second portion of the rope is connected to a fishing net, and the weight is kept by the rope securing mechanism at a first position. The process 960 also includes a process 968: dropping a weight connected to the rope from a first position to a second position, wherein the first position is higher than the second position. The process 960 may further include: transmitting the wireless signal from a transmitter, a remote controller, a mobile device, a computer, or a control center.

The method of applying a fishing system 100 and the method for controlling a fishing system in FIG. 9 and FIG. 10 can enhance the effectivity and the selectivity for capturing the invasive fish species (intended to be removed). The remote/wireless triggering can prevent from mis-triggering caused by the wave or the current. In addition, the location to be set can away from the shore and the capturing area may not be limited by trigging ropes.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In view of the above, although the present invention has been disclosed by way of preferred embodiments, the above preferred embodiments are not intended to limit the present invention, and one of ordinary skill in the art, without departing from the spirit and scope of the invention, the scope of protection of the present invention is defined by the scope of the claims.

What is claimed is:

1. A fishing system for fishing in a body of water, comprising:
    a post disposed in the body of water, wherein a first portion of the post is above a water surface of the body of water;
    a fishing net disposed in the body of water;
    a rope slidably attached to the post, wherein a first portion of the rope is connected to a weight, and a second portion of the rope is connected to the fishing net; and
    a fishing device trigger apparatus disposed on the first portion of the post, and the fishing device trigger apparatus including:
    an actuator;
    a wireless receiver for receiving a wireless signal to control the actuator; and
    a rope securing mechanism coupled to the actuator, wherein a portion of the rope is secured to the rope securing mechanism for holding the weight;
    wherein, in response to receiving the wireless signal, the wireless receiver controls the actuator to cause the rope securing mechanism to release the rope.

2. The fishing system for fishing in the body of water of claim 1, wherein the actuator includes a motor.

3. The fishing system for fishing in the body of water of claim 1, wherein the rope securing mechanism includes a tapered or non-tapered screw.

4. The fishing system for fishing in the body of water of claim 3, wherein the screw includes a base adjacent to the actuator and a tip away from the actuator, wherein a rotation of the screw moves the portion of the rope secured by the rope securing mechanism from the base to the tip, thereby releasing the rope.

5. The fishing system for fishing in the body of water of claim 1, further comprising a sensor disposed under the water surface.

6. The fishing system for fishing in the body of water of claim 5, wherein the sensor includes an antenna for detecting passive integrated transponder tags, a camera, an acoustic sensor, a sensor for radio signals, a heat sensor, or a light sensor.

7. The fishing system for fishing in the body of water of claim 1, further comprising a baiting device disposed within the fishing net.

8. A method for controlling a fishing system, comprising:
    receiving a wireless signal by a wireless receiver;
    activating an actuator; and
    causing a rope securing mechanism coupled to the actuator to release a rope,
    wherein a first portion of the rope is connected to a weight, a second portion of the rope is connected to a fishing net, and the weight is kept by the rope securing mechanism at a first position.

9. The method for controlling a fishing system of claim 8, wherein the actuator includes a motor.

10. The method for controlling the fishing system of claim 8, wherein causing the rope securing mechanism coupled to the actuator to release the rope further including:
    rotating a screw of the rope securing mechanism.

11. The method for controlling the fishing system of claim 8, further comprising:
    transmitting the wireless signal from a transmitter, a remote controller, a mobile device, a computer, or a control center.

12. The method for controlling the fishing system of claim 8, further comprising:
    collecting data using a sensor disposed under a water surface.

13. The method of controlling a fishing system of claim 12, wherein the sensor includes an antenna for detecting passive integrated transponder tags, a camera, an acoustic sensor, a sensor for radio signals, a heat sensor, or a light sensor.

14. The method for controlling the fishing system of claim 8, further comprising
    setting up a baiting device before causing the rope securing mechanism coupled to the actuator to release the rope.

* * * * *